(12) United States Patent
Ootake

(10) Patent No.: US 9,938,405 B2
(45) Date of Patent: Apr. 10, 2018

(54) HYBRIDIZED INSULATING RESIN MATERIAL FOR HIGH VOLTAGE EQUIPMENT AND HIGH VOLTAGE EQUIPMENT USING THE SAME

(71) Applicant: Hitachi, Ltd., Chiyoda-ku, Tokyo (JP)

(72) Inventor: Atsushi Ootake, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 14/889,958

(22) PCT Filed: May 14, 2013

(86) PCT No.: PCT/JP2013/063383
§ 371 (c)(1),
(2) Date: Nov. 9, 2015

(87) PCT Pub. No.: WO2014/184863
PCT Pub. Date: Nov. 20, 2014

(65) Prior Publication Data
US 2016/0068676 A1 Mar. 10, 2016

(51) Int. Cl.
| | |
|---|---|
| C08G 59/42 | (2006.01) |
| C08L 63/00 | (2006.01) |
| C08K 3/32 | (2006.01) |
| C08K 3/36 | (2006.01) |
| C08L 9/02 | (2006.01) |
| C08L 9/04 | (2006.01) |
| C08L 9/06 | (2006.01) |
| H01B 3/28 | (2006.01) |
| H01B 3/40 | (2006.01) |
| C08K 5/06 | (2006.01) |
| B82Y 30/00 | (2011.01) |

(52) U.S. Cl.
CPC ............ *C08L 63/00* (2013.01); *C08K 3/36* (2013.01); *C08K 5/06* (2013.01); *C08L 9/02* (2013.01); *C08L 9/04* (2013.01); *C08L 9/06* (2013.01); *H01B 3/28* (2013.01); *H01B 3/40* (2013.01); *B82Y 30/00* (2013.01); *C08L 2203/20* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,791,144 A | 12/1988 | Nagou et al. | |
| 5,691,401 A | 11/1997 | Morita et al. | |
| 8,735,469 B2 | 5/2014 | Sano et al. | |
| 2010/0197848 A1* | 8/2010 | Verghese | C08J 3/24 524/502 |
| 2011/0014356 A1* | 1/2011 | Fornes | C09D 5/24 427/58 |
| 2011/0058948 A1* | 3/2011 | Jacob | C08J 5/04 416/230 |

FOREIGN PATENT DOCUMENTS

| | | | |
|---|---|---|---|
| JP | 63-108041 | A | 5/1988 |
| JP | 4-267008 | A | 9/1992 |
| JP | 7-109361 | A | 4/1995 |
| JP | 7-316345 | A | 12/1995 |
| JP | 9-176351 | A | 7/1997 |
| JP | 11-310710 | A | 11/1999 |
| JP | 2000-80285 | A | 3/2000 |
| JP | 2000-273277 | A | 10/2000 |
| JP | 2000-327865 | A | 11/2000 |
| JP | 2002-226641 | A | 8/2002 |
| JP | 2004-75835 | A | 3/2004 |
| JP | 2005-307190 | A | 11/2005 |
| JP | 2009-146604 | A | 7/2009 |
| JP | 2010-113987 | A | 5/2010 |
| JP | 2012-57121 | A | 3/2012 |

OTHER PUBLICATIONS

Sigma-Aldrich: "Surfactants Classified by HLB Numbers" (no date).*
Extended European Search Report issued in counterpart European Application No. 13884907.0 dated Nov. 29, 2016 (seven (7) pages).
Database WPI Week 200118 Thomson Scientific, London, GB; AN 2001-171910 XP002764371 of document B15 (two (2) pages).
Database WPI Week 200004 Thomson Scientific, London, GB; AN 2000-048023 XP002764370 of previously submitted document B1 (two (2) pages).
International Search Report (PCT/ISA/210) issued in PCT Application No. PCT/JP2013/063383 dated Aug. 27, 2013 with English-language translation (four (4)pages).
Japanese-language Written Opinion (PCT/ISA/237) issued in PCT Application No. PCT/JP2013/063383 dated Aug. 27, 2013 (four (4) pages).
Japanese Office Action issued in counterpart Japanese Application No. 2015-516786 dated Apr. 12, 2016 with English-language translation (fourteen (14) pages).

* cited by examiner

*Primary Examiner* — Michael J Feely
(74) *Attorney, Agent, or Firm* — Crowell & Moring LLP

(57) ABSTRACT

An object of the present invention is to provide a hybridized insulating resin material, in which a viscosity is low to ensure a molding ability and the occurrence of voids is suppressed with respect to a resin material to which 2 to 20 wt % of fine particles of 100 nm or less are added, and a high voltage equipment including the hybridized insulating resin material. The object is achieved by providing a hybridized insulating resin material for a high 1.0 voltage equipment, which contains 2 to 20 wt % of fine particles having a particle size of 100 nm or less and contains a nonion surfactant having an HLB value of 2 to 8, and a high voltage equipment including the hybridized insulating resin material.

7 Claims, 4 Drawing Sheets

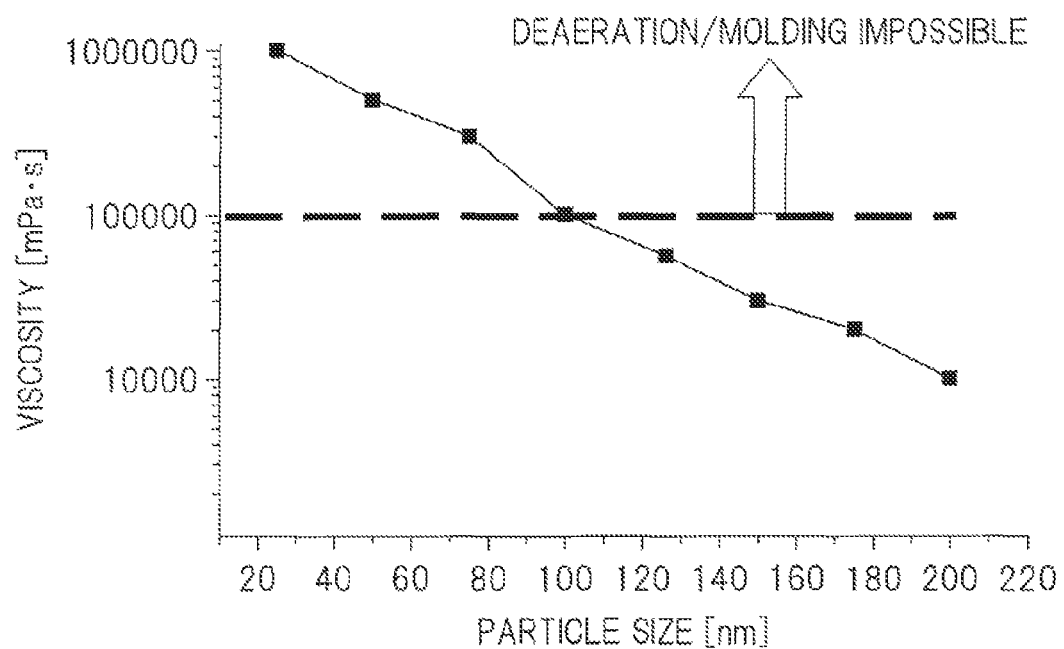

HYBRIDIZED INSULATING RESIN MATERIAL FOR HIGH VOLTAGE EQUIPMENT AND HIGH VOLTAGE EQUIPMENT USING THE SAME

TECHNICAL FIELD

The present invention relates to a hybridized insulating resin material for a hint voltage equipment and a high voltage equipment using the same.

BACKGROUND ART

In equipment used at a high voltage such as a transformer, a motor, a switch gear, a power transmitting and transforming equipment, a high voltage element and others, it is necessary to insulate the circuit conductors provided in the equipment or the grounds from each other. To this end, a thermosetting resin having excellent electric insulation has been used as an insulating layer. As a thermosetting resin suitable for such an insulating material of a large-sized high voltage electrical equipment, a thermosetting epoxy resin is generally used because it is inexpensive and has high performance as an electrical, insulating resin. Furthermore, as the insulating resin material, an epoxy resin-based molding material which contains a curing agent and an inorganic filler such as silica has been used.

Particles of a predetermined concentration or more are added to the thermosetting resin so as to improve characteristics of the resin such as fracture toughness, high strength, thermal stability, breakdown resistance, long life, environmental load and the like. On the other hand, a viscosity of the thermosetting resin significantly increases due to a polarity thereof particularly when hydrophobic fine particles of 100 nm or less are present in a raw material liquid of the thermosetting resin. Here, when the viscosity is increased due to the presence of the fine particles in the raw material liquid of thermosetting resin such as an epoxy resin, the resin loses fluidity and it leads to a problem of the occurrence of voids which cause a significant reduction in a mechanical strength. Here, when the voids occur in the resin, the discharge in the voids which is referred to as a partial discharge is induced, resulting in the destruction of the equipment, and thus the voids are not preferable particularly in the high voltage equipment. In addition, in the case where the voids are present in the resin, there is a problem that the vacuum molding cannot be performed if the vacuum molding is to be performed.

For example, Patent Document 1 discloses an invention that relates to a semiconductor sealing epoxy resin composition applicable to a semiconductor device. Specifically, Patent Document 1 describes a thermosetting resin composition containing 0.01 to 5.0 parts weight of a surfactant having Hydrophile-Lipophile Balance (FISH) of 10 or more in addition to the epoxy resin. However, in the hydrophilic surfactant in which a limit of an HLB value is 10 or more, it is not possible to improve the dispersibility of fine filler (hereinafter, referred to as nanofiller) of 100 nm or less in particular in the epoxy resin. In addition, in the case of using the surfactant with a high HLB value, it is not possible to lower the viscosity of the resin, which causes the problem that the resin material does not flow through a pipe in the case of performing the vacuum molding and voids occur in a molded resin.

RELATED ART DOCUMENTS

Patent Documents

Patent Document 1: Japanese Patent Application Laid-Open Publication No. H11-310710

SUMMARY OF THE INVENTION

Problems to be Solved by the Invention

Therefore, as a thermosetting resin for a high voltage electrical equipment, it has been desired to lower the viscosity of the resin while exhibiting the function of the resin by containing particles of a predetermined concentration or more for the functional improvement of the resin.

Means for Solving the Problems

The inventor of the present application has conducted intensive research so as to solve the above-mentioned problems. Then, the inventor has found that a hybridized insulating resin material, for a high voltage equipment, which contains 2 to 20 wt % of fine particles having a particle size of 100 nm or less and contains a nonion surfactant having an HLB value of 2 to 8 in a thermosetting resin, lowers the viscosity of the resin while exhibiting the function of the resin, and has completed the present invention.

Namely, the present invention is as follows.

(1) A hybridized insulating resin material for a high voltage equipment, containing 2 to 20 wt % of fine particles of 100 nm or less and containing a nonion surfactant having an HLB value of 2 to 8.

(2) The hybridized insulating resin material according to (1), in which the resin is an epoxy resin.

(3) The hybridized insulating resin material according to (2), in which a curing agent of the epoxy resin is an organic compound having an acid anhydride structure.

(4) The hybridized insulating resin material according to (1), in which the resin is a resin for vacuum molding.

(5) The hybridized insulating resin material, according to (1), in which the fine particles are at least one particles selected from a group including silica particles, elastomer particles and alumina particles.

(6) The hybridized insulating resin material according to (5), in which the elastomer particles are at least one rubber selected from a group including a nitrile butadiene rubber or a styrene butadiene rubber and a silicone rubber.

(7) The hybridized insulating resin material according to (5), in which the silica particles are derived from silica manufactured by a fuming method.

(8) The hybridized insulating resin material according to (1), further containing a filler having a particle size of several tens of μm.

(9) The hybridized insulating resin material, according to (8), in which the filler is at least one particles selected from a group including silica particles, elastomer particles and alumina particles.

(10) A high voltage equipment including the hybridized insulating resin material according to any one of (1) to (9) described above.

Effects of the Invention

According to the present invention, in is possible to suppress the viscosity of the resin to which the particles of 100 nm or less are added. Hence, it is possible to increase the added amount of fine particles, to exhibit specific functions of the fine particles, and no improve a resin handling ability at the time of occurrence of voids or molding.

According to the present invention, the addition of the nonion surfactant can lower the viscosity of the resin and improve the fluidity thereof and can prevent the occurrence of the voids. In addition, since the nanofiller can be dispersed at a high concentration, it is possible to improve the fracture toughness and the like.

Furthermore, according to the present invention, it is possible to produce a hybridized insulating resin material capable of adjusting a linear expansion coefficient at a low cost while maintaining the function achieved by the addition of the fine particles.

BRIEF DESCRIPTIONS OF THE DRAWINGS

FIG. 4 is a graph illustrating a relationship between a particle size and a viscosity in the present invention.

DETAILED DESCRIPTION OF PREFERRED EMBODIMENTS

Figure 1:
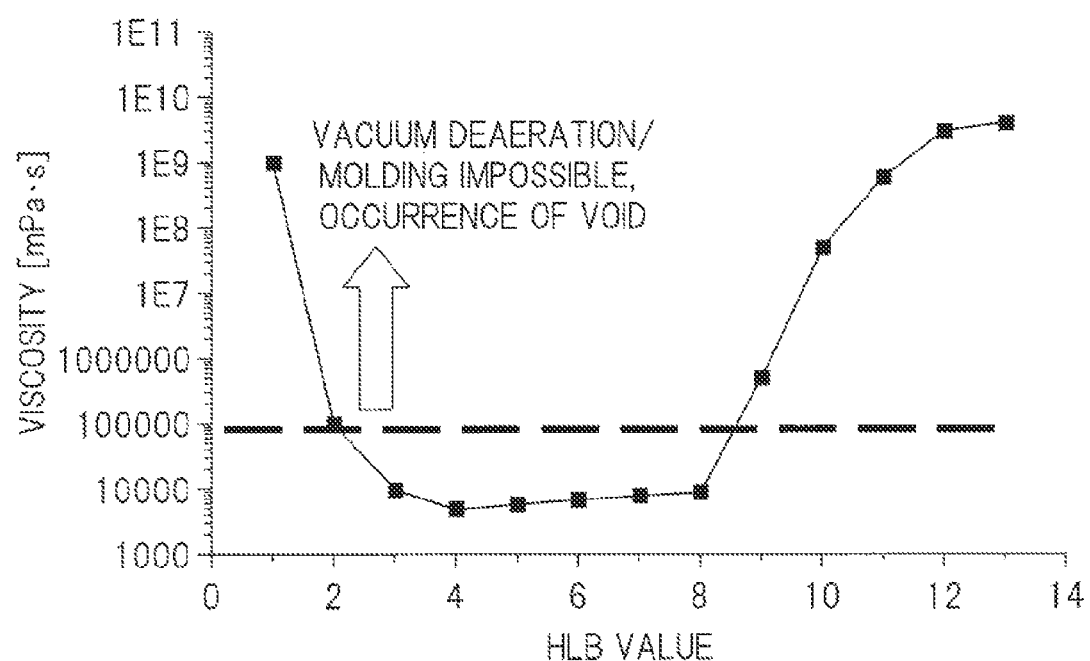
FIG. 1 is a graph illustrating a relationship between an HLB value and a viscosity in the present invention.

1. Hybridized Insulating Resin Material of Present Invention

The present invention relates to a hybridized insulating resin material for a high voltage, equipment, which contains 2 to 20 wt % of fine particles of 100 nm or legs and contains a nonion surfactant having an HLB value of 2 to 8.

When fine particles (microparticles) of 100 nm or less are present in a raw material liquid of thermosetting resin, fluidity is lost due to an increase in viscosity, and the vacuum molding becomes almost impossible or voids occur particularly when the vacuum molding is performed. The occurrence of voids is not preferable particularly in the high voltage equipment, and a discharge in the voids referred to as a partial discharge is induced, resulting in the destruction of the equipment. The viscosity at which the resin loses the fluidity due to the presence of such fine particles is $10^5$ mPa·s or more. Thus, when about 0.25 to 1 wt % of the nonion surfactant having an HLB value of 2 to 8 is added to such an uncured resin material whose fluidity is likely to be lost, the viscosity is lowered and the fluidity of the resin material can be restored. In this manner, it is possible to increase the added amount of the fine particles, to exhibit specific functions of the b fine part cries, and to improve a resin handling ability at the time of occurrence of voids or molding.

(1) Resin Used for Hybridized Insulating Resin Material of Present Invention

As the resin used for the hybridized insulating resin material of the present invention, any resin can be used as long as the resin is suitable for use in the high voltage equipment, and for example, a thermosetting resin can be used. The thermosetting resin used in the present invention refers to a thermosetting resin alone and a reaction product or a mixture with other materials, and any resin may be used as long as the resin causes no undesirable interaction or little interaction with the fine particles or the like used in the present invention. Examples of the thermosetting resin may include a phenol resin, a furan resin, a xylene formaldehyde resin, a urea resin, a melamine resin, an aniline resin, an alkyd resin, an unsatupolyester resin, an epoxy resin, a polyimide resin, a triazine resin, a polyamide resin, a silicone resin and the like, but the thermosetting resin is not limited thereto. In addition, compounds with other resins such as modified products of these resins, elastomer and the like can also be used.

Note that a glass transition temperature serves as an indicator of a breakdown strength or a heat resistance, and a thermoplastic resin having a high glass transition temperature and capable of charging much fine particles of the present invention can also be used in the present invention. Examples of the resin may include polyphenylene, polyoxylene, polyphenylene oxide, polysulfone, polyether sulfone, polyetherimide, polyphenylene sulfide and the like.

It is preferable to use an epoxy resin for the hybridized insulating resin material of the present invention. This is because the epoxy resin is inexpensive and has high performance and it is excellent in terms of, for example, electrical characteristics, mechanical characteristics, water resistance, chemical resistance, heat resistance and dimensional stability, does not produce volatile substances at the time of curing, has a small dimensional change in a molded product and excellent electrical properties, is rich in fluidity and can be molded even at a relatively low pressure, and is thus suitable for a molded product having a complicated shape and required to have a dimension accuracy. Furthermore, the epoxy resin has an advantage in that the viscosity thereof significantly increases due to a polarity thereof particularly when hydrophobic fine particles of 100 nm or less are mixed. Examples of the epoxy resin used for the hybridized insulating resin material of the present invention are monomer, oligomer and polymer which have two or more epoxy groups in one molecule, and examples thereof may include epoxy resins such as a bisphenol A type epoxy resin, a bisphenol AD type epoxy resin, a bisphenol S type epoxy resin, a bisphenol F type epoxy resin, a bisphenol A novolac type epoxy resin, a hydrogenated bisphenol A type epoxy resin, an ethylene oxide adduct bisphenol A type epoxy resin, a propylene oxide adduct bisphenol A type epoxy resin, a novolac type epoxy resin, a glycidyl ester type epoxy resin, a biphenyl type epoxy resin, a phenol novolac type epoxy resin, an alkylphenol novolac type epoxy resin, a polyglycol type epoxy resin, a cyclic aliphatic epoxy resin, a cyclopentadiene type epoxy resin, a dicyclopentadiene type epoxy resin, a cresol novolac type epoxy resin, a glycidyl amine type epoxy resin, a naphthalene type epoxy resin, a urethane-modified epoxy resin, a rubber-modified epoxy resin, an epoxy-modified polysiloxane and the like, but the epoxy resin is not limited thereto. In addition, the above-mentioned epoxy resins may be used alone or two or more of the epoxy resins may be used in combination at any ratio. Furthermore, there is also no limitation with respect to an epoxy equivalent, a melting point, a softening point and the like.

A curing agent may be used for curing the epoxy resin used in the present invention. The epoxy resin refers to a thermosetting resin that can be cured by crosslink-networking the epoxy groups remaining in a polymer. Specifically, the crosslink networking is performed by a heat curing treatment after mixing a prepolymer prior to the crosslink networking and a curing agent. As the curing agent, various polyamines or acid anhydrides are known. In addition, the epoxy resin can obtain a setting resin having various characteristics depending on the curing agent to be combined, and examples of the curing agent used for curing the epoxy resin of the hybridized, insulating resin material of the present invention may include an organic compound having an acid anhydride structure. Examples of the acid anhydride-based curing agent may include phthalic anhydride, tetra and hexahydro phthalic anhydride, methyl tetrahydrophthalic anhydride, anhydrous methyl nadic, pyromellitic anhydride, anhydrous HET acid, dodecenyl succinic anhydride and the like, but the acid anhydride-based curing agent is not limited thereto.

A method of molding the hybridized insulating resin material of the present invention is not particularly limited, and any known molding method may be used. Examples of the molding method may include an injection molding method, an extrusion molding method, an inflation molding method, a calendar molding method, a stretch blow molding method, a vacuum casting method, a vacuum molding method, a pressure molding method, a compression molding method and the like, but the molding method is not limited thereto.

As the method of molding the hybridized insulating resin material of the present invention, the vacuum molding method is suitable. The vacuum molding refers to a technique of manufacturing a duplicate by using a silicone rubber or an FRP as a mold for duplication instead of a metal mold and pouring a resin to the mold in a vacuum. In the vacuum molding, the resin flows by the weight of the resin and is subjected to a process of pulling out the voids inside the resin by deaeration after entering the mold. Therefore, in the vacuum molding, it is necessary to eliminate the internal voids after the resin flows by the weight of the resin itself to reach all parts of the mold. Thus, if the viscosity is high when the vacuum molding is performed, the resin material does not flow through the pipe, and further, even when the mold flows, there arises a problem that voids to be a cause of an electrical breakdown in the high voltage equipment occur inside the molded resin. The hybridized insulating resin material of the present invention has a low viscosity while having a high performance, and is thus suitable for use in the vacuum molding.

(2) Fine Particles of Present Invention

The fine particles of the present invention aim to improve the characteristics of the hybridized insulating resin material of the present invention. As the fine particles of the present invention, any fine particles may be used as long as the fine particles are inexpensive and can add functions such as electrical insulation, crack resistance, fracture toughness, high strength, long life and breakdown resistance improvement to the resin. For example, in addition so silica particles, elastomer particles and alumina particles, examples of the inorganic fine particles may include mica, titania ($TiO_2$), tantalum oxide ($Ta_2O_5$), zirconia ($ZrO_2$), silicon nitride ($Si_3N_4$), barium titanate ($BaO.TiO_2$), barium carbonate ($BaCO_3$), lead titanate ($PbO.TiO_2$), lead zirconate titanate (PZT), lead lanthanum zirconate titanate (PLZT), gallium oxide ($Ga_2O_3$), spinel ($MgO.Al_2O_3$), mullite ($3Al_2O_3.2SiO_2$), cordierite ($2MgO.2Al_2O_3/5SiO_2$), talc ($3MgO4SiO_2.H_2O$), aluminum titanate ($TiO_2$—$Al_2O_3$), yttria-containing zirconia ($Y_2O_3$—$ZrO_2$), barium silicate ($BaO.8SiO_2$), boron nitride (BN), calcium carbonate ($CaCO_3$) calcium sulfate ($CaSO_4$), zinc oxide (ZnO), magnesium titanate ($MgO.TiO_2$), barium sulfate ($BaSO_4$), organic bentonite and carbon (C) and include organic fine particles of heat resistant resins having an amide bond, an imide bond, an ester bond or an ether bond or combinations thereof, but the fine particles are not limited thereto. Among these, the silica particles, the elastomer particles and the alumina particles are preferable. These fine particles may be used alone or in combination as the fine particles of the present invention. In addition, any of crystalline and fusible fine particles may be used as long as it does not impair the function of the hybridized insulating resin material of the present invention, and fine particles of any shape such as a spherical shape or an irregular shape may be used. In addition, roughening treatment may be performed on the surface and an organic surface treatment agent may be applied so as to improve the adhesion strength with the resin component.

Silica particles, elastomer particles and alumina particles suitable as the fine particles according to the present invention have following preferable features for the improvement of the hybridized insulating resin material of the present invention. That is, the silica particles contribute to the improvement of the electrical insulation, and the elastomer particles contribute to the improvement of the crack resistance, i.e., the fracture toughness of the resin. In addition, the alumina particles can be selected for the switch gear in terms of the corrosion resistance. Furthermore, the silica particles and the alumina particles improve the high voltage resistance and also improve the glass transition temperature. Moreover, by adding the surfactant, it is possible to exhibit the function of the fine particles without increasing the viscosity of the resin to which the fine particles are added. As described above, according to the present invention, it is possible to produce the resin excellent in the resin handling ability (low viscosity) and having the high function added thereto.

Here, some manufacturing methods of silica fine particles among the fine particles according to the present invention are known, and an example thereof is a fuming method. The fuming method refers to a method of obtaining silica by oxidizing a silane compound in a high-temperature flame. The silica particles obtained in this method are preferable in that there are few OH groups on the surface, the compatibility is high with respect to the resins having a relatively low polarity, and the effect of the surfactant can be enhanced. In addition, the silica produced by the fuming method is preferable because the silica can enhance the breakdown voltage characteristics of the hybridized insulating resin material of the present invention.

The elastomer particles among the fine particles according to the present invention can expect similar effects by surface modification as described above, are effective for the improvement of the fracture toughness and can improve the handling ability of the uncured resin and the crack resistance of the cured resin. This function exhibits a high effect particularly in the case of the fine particles of about 100 nm. Preferably, the elastomer particles may be at least one rubber selected from the group including a nitrile butadiene rubber or a styrene butadiene rubber and a silicone rubber. In particular, since the nitrile butadiene rubber contains a CN group and the CN group is exposed also on the surface thereof, the compatibility with polar resins such as an epoxy resin is high, and the nitrile butadiene rubber is convenient particularly when used for the hybridized insulating resin material for which the heat resistance performance is required. The silicone rubber has an excellent heat resistance and is particularly convenient to the hybridized insulating resin material for which the heat resistance performance is required. In addition, the use as the fine particles of the present invention provides a great merit in terms of the mechanical and chemical stability. However, since there is also a case where the silicone rubber has a low compatibility with the epoxy resin due to the hydrophobicity thereof, an appropriate surfactant is selected when the silicone rubber is used as the fine particles of the present invention.

An average particle size of the fine particles according to the present invention is 100 nm or less. This is because in the case where 20 wt % of the fine particles are contained in the epoxy resin, the viscosity of $10^5$ mPa·s or more can be obtained when the particle size is 100 nm or less. In addition, when the particle size is in this range, it is possible to prevent the aggregation of the fine particles, and it is also possible to prevent the appearance failure of the molded product due to the clogging or non-uniform resin flow. In addition, as long as the particle size is 100 nm or less, particles having different particle sizes may be used in combination as necessary.

In order for the fine particles of the present invention to exhibit the function in the hybridized insulating resin material, in is desirable that at least 2 wt % or more of the fine particles are contained. In the cured resin. On the other hand, however, when more than 20 wt % of the fine particles are contained, the effect is saturated and also the aggregation of the particles occurs. There is also a problem in cost. Therefore, as the added amount of the fine particles of the present invention, 2 to 20 wt % is desirable with respect to the hybridized insulating resin material.

As a method of dispersing the fine particles of the present invention into a resin solution, any known method may be used. For example, a mixer mixing, a bead dispersion, a dispersion by a homogenizer, a roll kneading and the like can be applied, and there is no particular limitation as long as the method can perform the sufficient dispersion.

(3) Nonion Surfactant of Present Invention

The nonion surfactant according to the present invention refers to a surfactant that exhibits no ionic characteristics even when dissolved in water but exhibits surface activity, and it imparts functions such as fracture toughness, high strength, thermal stability, breakdown resistance, long life, environmental load and the like to the hybridized insulating resin material of the present invention by making it possible to appropriately disperse the fine particles of the present invention in the hybridized insulating resin material. Therefore, any type of surfactant can be used as long as the surfactant can give such functions, and although there is no restriction for the use of a cationic type or an anionic type, a nonion type is preferable for use in the hybridized insulating resin material for the high voltage equipment of the present invention.

Examples of the nonion surfactant according to the present invention may include: an ester type such as glycerin lauric acid, glyceryl monostearate, sorbitan fatty acid ester or sucrose fatty acid ester; an ether type such as polyoxyethylene alkyl ether, penta ethylene glycol mono dodecyl ether, octaethylene glycol mono dodecyl ether, polyoxyethylene alkyl phenyl ether, nonoxynol, nonoxynol-9 or polyoxyethylene polyoxypropylene glycol; an ester ether type such as polyoxyethylene sorbitan fatty acid ester, polyoxyethylene hexane fatty acid ester or sorbitan fatty acid ester polyethylene glycol; an alkanolamide type such as lauric acid diethanolamide, diethanolamide of oleic acid, stearic acid diethanolamide or cocamide DEA; an alkyl glycoside such as octyl glucoside, decyl glucoside or lauryl glucoside; and a higher alcohol such as cetanol, stearyl alcohol or oleyl alcohol, but the nonion surfactant is not limited thereto. Among these, polyoxyethylene phenyl alkyl ether is preferable.

The HLB value used in the present invention refers to a value of 0 to 20 that indicates a degree of affinity of the surfactant with respect to the wafer and the insoluble organic compound, and the HLB value closer to 0 represents higher lipophilicity and the HLB value closer to 20 represents higher hydrophilicity. In a Kawakami method, it can be obtained by the following formula.

$$\text{HLB value} = 7 + 11.7 \log (\text{sum of formula weight of hydrophilic portion/sum of formula weight of lipophilic portion}) \quad (1)$$

In Patent Document 1, the HLB value is specified as being 10 or more, but such a hydrophilic surfactant cannot improve the dispersibility of the fine particles of 100 nm or less (hereinafter, referred also to as fine filler or nanofiller) particularly in the epoxy resin. On the other hand, generally, it is not possible to lower the viscosity in the case of using the surfactant having a high HLB value. In particular, in the vacuum molding, it is necessary to eliminate the internal voids after the resin flows by the weight of the resin itself to reach all parts of the mold. Thus, if the viscosity is high when the vacuum molding is performed, the resin material does not flow through the pipe, and there arises a problem that the voids occur in the molded resin. The occurrence and presence of the voids are not preferable particularly in the high voltage equipment. This is because the discharge in the voids referred to as the partial discharge is induced, resulting in the destruction of the equipment. As described above, it becomes difficult to handle the resin material at the viscosity of $10^4$ mPa·s or less and the deaeration and molding are not possible at the viscosity of $10^5$ mPa·s or more. As illustrated in FIG. 1 and examined in the following examples, the nonion surfactant having the HLB of 2 to 8 according to the present invention has a viscosity of $10^5$ mPa·s or less. Thus, the present invention is characterized by lowering the viscosity by adding the surfactant having the HLB value of 2 to 8 in order to overcome the above-mentioned problems.

Examples of the nonion surfactant having the HLB value of 2 to 8 according to the present invention may Include polyoxyethylene phenyl alkyl ether, polyglycerol fatty acid ester, sorbitan fatty acid ester and glycerin fatty acid ester. Polyoxyethylene phenyl alkyl ether is preferable. A typical structural formula thereof is shown below.

[Chem. 1]

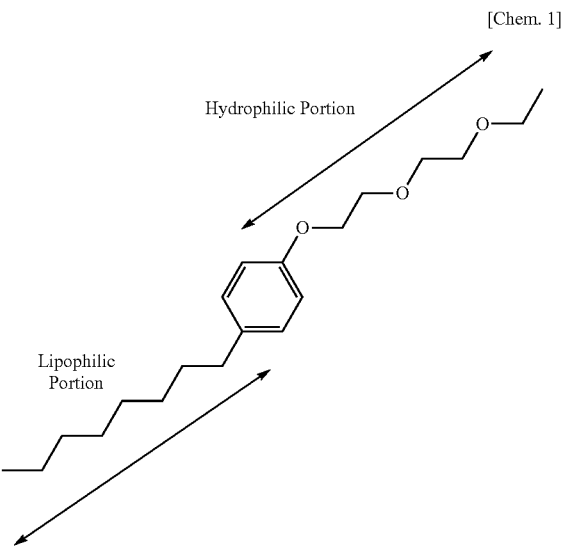 [SMILES: CCCCCCCCc1ccc(OCCOCCOCC)cc1]

(4) Others

In order to improve the other functions and the ease of the manufacturing operation, surfactants such as a filler, an antifoaming agent or a leveling agent, coloring agents such as a dye or a pigment and materials such as a curing accelerator, a heat stabilizer, antioxidant, a flame retardant or a lubricant may be contained. In the hybridized insulating resin material of the present invention as necessary in addition to those mentioned above.

For example, in addition to the fine particles mentioned above, a filler containing particles having a particle size of several tens of μm may be contained. As the particles, one of the silica particles, the elastomer particles and the alumina particles or a combination thereof is preferable. The introduction of the particles of such a size into the hybridized insulating resin material, of the present invention is preferable because the linear expansion coefficient is adjusted and the cost of the hybridized insulating resin material is suppressed. This is because a linear expansion coefficient of the resin is high and the cost thereof is also high in some cases. Furthermore, the filler does not affect the action of the fine particles relating to the present invention. Also, since the viscosity of the hybridized insulating resin material of the present invention can be suppressed to be low by the surfactant of the present invention even when the filler is used, the function of the present invention is not impaired by the use of the filler.

As described above, the present invention is preferable because it is possible to produce the hybridized insulating resin material capable of adjusting the linear expansion coefficient at a low cost while maintaining the function achieved by the addition of the fine particles. The added amount of the particles may be in the range of 2 to 10 wt % in any case, but may be selected, depending on the price and the properties (electrical insulation, crack resistance and costs) required in the hybridized insulating resin material.

2. High Voltage Equipment of Present Invention

The high voltage equipment of the present invention relates to a high voltage equipment including "1. Hybridized Insulating Resin Material of Present Invention" mentioned, above, and may be a transformer, a motor, a switch gear, a power transmitting and transforming equipment or a high voltage element, but is not limited thereto. The high voltage electrical equipment including the hybridized, insulating resin material having excel lent electrical insulation is preferable because circuit conductors provided in the equipment or the grounds are effectively insulated.

Next, the present invention will, be described based on the examples, but the present invention is not limited by these examples and includes various modification examples.

Example 1

In the example 1, as illustrated in FIG. 1, a relationship between the viscosity of the epoxy resin to which 20 wt % of the fine particles of 100 nm or less were added and the HLB value of the surfactant used for suppressing the viscosity was analyzed. The nonion surfactant added herein was polyoxyethylene phenyl alkyl ether. A typical structural formula thereof is shown below.

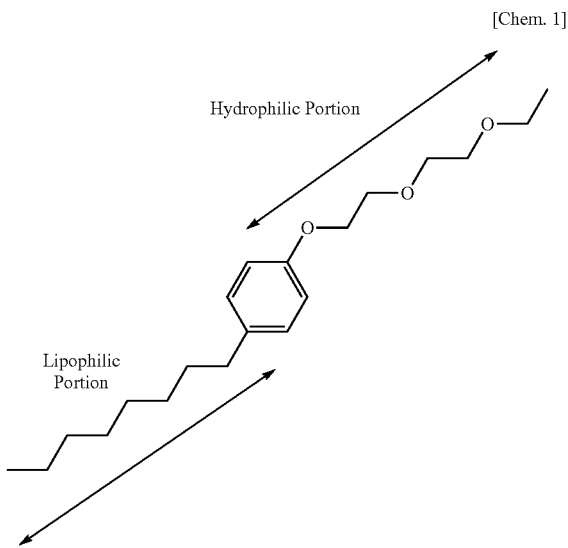 [SMILES: CCCCCCCCc1ccc(OCCOCCOCC)cc1]

[Chem. 1]

The added amount of the surfactant was 0.25 wt %.

The HLB value of the polyoxyethylene phenyl alkyl ether was changed to 1 to 14 and the viscosity of the epoxy resins each containing the polyoxyethylene phenyl alkyl ether was measured by a viscometer.

As a result, as illustrated in FIG. 1, the viscosity thereof was $10^5$ mPa·s or less in the range of the HLB value of 2 to 8. Thus, in the following experiment, polyoxyethylene phenyl alkyl ether having an HLB value of 8 was used.

Based on the examination mentioned above, 6 wt % of a nitrile butadiene rubber having an average particle diameter of 100 nm was added to a resin for a transformer, and a mold test was performed in the following manner. First, the resin mixed material (epoxy resin main component, acid anhydride curing agent, 50 wt % of a silica filler and 0.25 wt % of a surfactant) was vacuum-deaerated. The viscosity at this stage was 8000 mPa·s and the molding was sufficiently possible. Thus, the resin mixed material was injected into the mold heated to about 80° C. The injected amount of the resin was about 8 kg, and a problem due to the viscosity did not occur at the time of the injection. An injection time was about 10 minutes and it was found that a pot life of the resin was satisfied. The curing of the resin was performed in accordance with a curing schedule: of a primary curing at 120° C. for three hours and a secondary curing at 150° C. for four hours. The cured resin was taken out, and a K1c value corresponding to a plane strain fracture toughness value was measured.

As a result, the K1c value of the resin was 1.5 times the K1c value of the case where a nitrile butadiene rubber was not added. The K1c value of the resin was similar to the K1c value of the resin to which the surfactant was not added. With respect to the results of the tests performed for the resin on dielectric constant, dielectric loss tangent, impulse breakdown voltage and thermal deterioration, any difference from the resin to which the surfactant was not added was not observed at all. On the other hand, with respect to the analysis result for the resin to which an anionic surfactant having the same HLB value was added, the thermal deterioration was particularly increased and the deterioration life became ½ or less. When the anionic surfactant is used, ionization is caused and the ionized counter ions may promote a deteriorative reaction. Furthermore, when the added amount of the nonion surfactant was 1.2 wt %, a similar deterioration phenomenon occurred. From the above, it was shown that it was preferable that the nonion surfactant was introduced at a concentration of 1 wt % or less in the resin of the present invention.

As described above, according to the present invention, it was shown that the addition of the nonion surfactant could lower the viscosity of the resin and improve the fluidity and further could prevent the occurrence of the voids. In addition, it was shown that it was possible to improve the fracture toughness and the like because the nanofiber could be dispersed at a high concentration.

Example 2

In the example 2, a relationship between the added amount of nanofiller and a function was analyzed, and a lower limit and an upper limit of the added amount were obtained.

Figure 2:
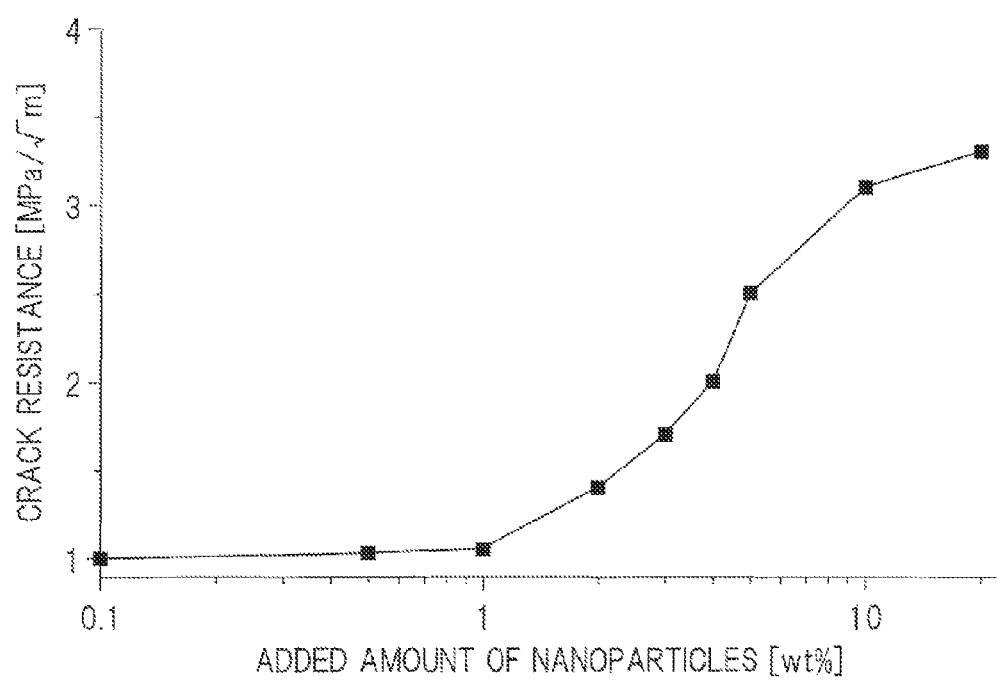
FIG. 2 is a graph illustrating an effect of a nanoparticle addition of the present invention.

An experiment was performed on the added amount of the fine particles suitable for the present invention in the following manner. First, the added amount and the fracture toughness (crack resistance) of the resin to which elastomer particles of 100 nm or less were added were examined. As a result, as illustrated in FIG. 2, it was shown that when the added amount of the fine particles was 2 wt % or more, the crack resistance was enhanced as the added amount increased. Namely, it was shown that the lower limit of the added amount at which the function of the fine particles was exhibited was 2 wt %.

Figure 3:
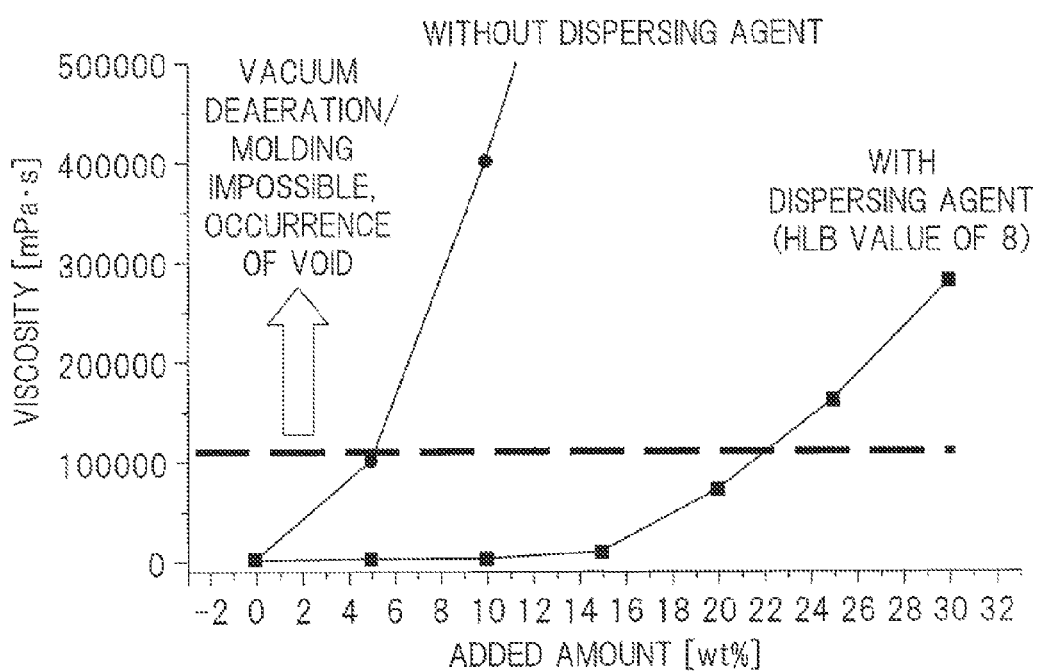
FIG. 3 is a graph illustrating viscosity characteristics of an epoxy resin of the present invention.

Furthermore, the upper limit of the added amount of the fine particles according to the present invention was examined from a relationship between the added amount of the fine particles and the viscosity of the resin. FIG. 3 illustrates the result. Namely, in the case where the resin did not contain the nonion surfactant, the viscosity was increased by just adding several % of fine particles and the subsequent processes could not be performed. On the other hand, in the case where 0.25 wt % of polyoxyethylene alkyl phenol ether was added as the nonion surfactant, the increase in the resin viscosity was suppressed. Meanwhile, the addition up to 20 wt % was possible. Even when 20 wt % or more of polyoxyethylene alkyl phenol ether was added, the fracture toughness was not improved any more. Namely, since the fracture toughness was saturated at the point at which 20 wt % of polyoxyethylene alkyl phenol ether was added, it was shown that the upper limit of the added amount of the fine particles was 20 wt %.

As described above, it was shown that the added amount of the fine particles of 100 nm or less according to the present invention was desirably about 2 to 20 wt %.

Example 3

In the example 3, the particle size suitable for the fine particles according to the present invention was analyzed.

Specifically, a relationship between the particle diameter of the fine particles contained in the resin according to the present invention and the viscosity of the resin was examined. A concentration of the fine particles was set to 20 wt % with respect to the epoxy resin, and the viscosity thereof was measured while changing the diameter of the fine particles. FIG. 4 illustrates the result. From FIG. 4, it was shown that the viscosity of $10^5$ mPa·s or more was obtained in the range of the particle size of 100 nm or less.

Therefore, it was shown that the particle size suitable for the fine particles according to the present invention was 100 nm or less.

In the foregoing, the invention made by the inventor of the present invention has been concretely described based on the embodiment. However, it is needless to say that the present invention is not limited to the foregoing embodiment and various modifications and alterations can be made within the scope of the present invention.

The invention claimed is:

1. A hybridized insulating resin material for a high voltage equipment, containing: an epoxy resin, a curing agent, fine particles having a particle size of 100 nm or less, and a nonion surfactant having an HLB value of 2 to 8;
    wherein the fine particles are present in an amount of 2 to 20 wt % of the hybridized insulating resin material;
    wherein the fine particles comprise fine elastomer particles and optionally at least one of fine silica particles and fine alumina particles; and
    wherein the fine elastomer particles comprise at least one of a nitrile butadiene rubber, a styrene butadiene rubber and a silicone rubber.

2. The hybridized insulating resin material according to claim 1,
    wherein the curing agent is an organic compound having an acid anhydride structure.

3. The hybridized insulating resin material according to claim 1,
    wherein the hybridized insulating resin material is for vacuum molding.

4. The hybridized insulating resin material according to claim 1,
    wherein the fine silica particles are derived from silica manufactured by a fuming method.

5. The hybridized insulating resin material according to claim 1, further containing a filler having a particle size of several tens of μm.

6. The hybridized insulating resin material according to claim 5,
    wherein the filler is at least one of silica particles, elastomer particles and alumina particles.

7. A high voltage equipment comprising a cured product of the hybridized insulating resin material according to claim 1.

* * * * *